Feb. 25, 1964      W. C. HELLER, JR      3,121,915
ART OF EXTRUDING THERMOPLASTIC SHEETS
Filed June 25, 1958
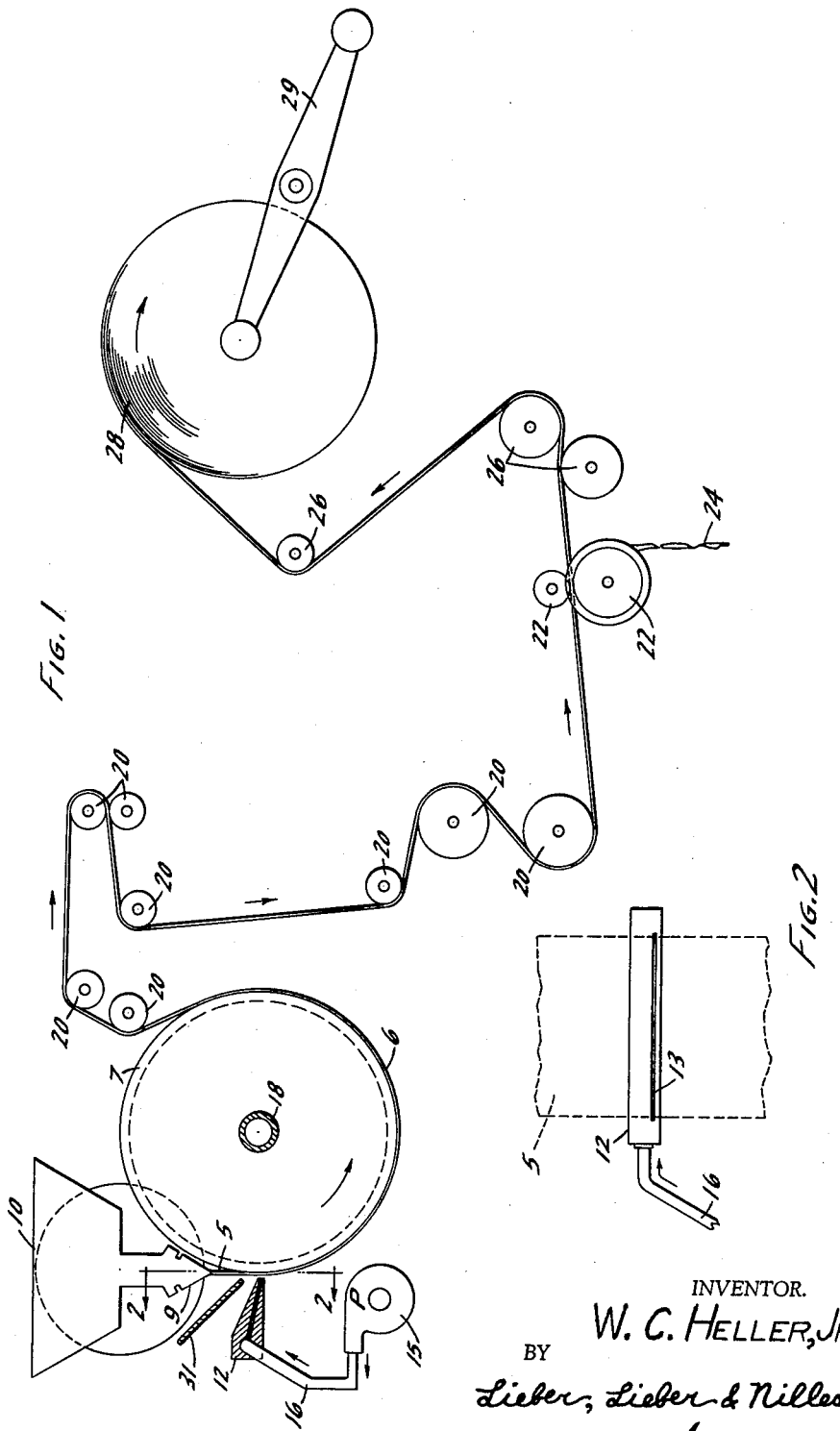
INVENTOR.
W. C. HELLER, JR.
BY
Lieber, Lieber & Nilles
ATTORNEYS

United States Patent Office 3,121,915
Patented Feb. 25, 1964

3,121,915
ART OF EXTRUDING THERMOPLASTIC SHEETS
William C. Heller, Jr., Milwaukee, Wis., assignor, by mesne assignments, to National Distillers and Chemical Corporation, New York, N.Y., a corporation of Virginia
Filed June 25, 1958, Ser. No. 744,556
7 Claims. (Cl. 18—15)

The present invention relates generally to improvements in the art of producing sheet material, and relates more particularly to improvements in the extrusion of relatively thin unsupported films of thermoplastic material.

A primary object of the invention is to provide an improved method of and apparatus for extruding webs of thermoplastic material in an exceedingly rapid and highly efficient manner and at exceptionally low cost.

Heretofore, it has been common practice to produce films of thermoplastic material by extruding the material in heated plastic condition through a slit die to form a flat sheet, the film being thereafter cooled by passing it through a water bath, by subjecting it to a cool air stream, or by passing it over a cool mandrel or about a cooled roll or rolls to solidify and set the same and being subsequently treated where necessary for ink receptivity, clarity or the like. In such methods of producing thermoplastic films, the water carryover when a cooling bath is used limits the speed of advancement and rewind, and when an air stream or a cooled roll or drum are used, it is difficult to maintain uniform film thickness. Furthermore, with a cooling mandrel or drum, air frequently becomes trapped between the cooling cylinders and the hot, highly plastic film to thereby cause sagging and bagginess, uneven cooling and setting and undesirable wrinkling and puckering of the film.

In the production of certain thermoplastic films, it has also been proposed to extrude the same from a circular die and to form an air bubble within the extruded tube to draw the material to the desired dimensions and gauge, the film being cooled by air and subsequently treated as necessary, slit longitudinally and then wound up into a roll. In such instances, the air cooling operation is undesirably slow, and the equipment for performing the same requires considerable space. It is additionally extremely difficult if not impossible to maintain the desired gauge control, the clarity of the film is generally not as good as desired, and a wide size range of circular dies are necessary.

Also, it has been proposed to produce film by extruding a tube into air and then drawing it about or through a circular mandrel which has a matte finish and is cooled and of a given diameter somewhat larger than the diameter of the die, the film being again subsequently treated when necessary and longitudinally slit and wound. However, this process is undesirably slow due to the friction created in passing the tube over or through the mandrel, a wide size range of dies are again necessary, a similarly wide range of mandrels are required, and the resultant film frequently has a marred finish.

In the copending application of Albert L. James, Serial No. 723,040, filed March 21, 1958, for Extension Method and Apparatus, it is proposed to extrude a curtain of unsupported thermoplastic material in substantially fluid condition into the nip formed between adjacent cooperating rolls or rollers rotated at a somewhat faster speed than the rate of extrusion so that the curtain is pulled from the source of extrusion toward and between the adjacent arcuate surfaces of the rollers to thereby form a sheet of desired thickness. The sheet thus formed is then further advanced in surface contact over one of the arcuate surfaces while it is simultaneously cooled as by internally cooling the carrying roll. This method obviously requires two cooperating rolls or rollers and careful and accurate relative positioning thereof, and when clear transparent thermoplastic sheeting is desired, considerable care must be taken to impart the proper surface characteristics to the cooperating rollers.

It is therefore another object of the present invention to provide an improved method of and apparatus for producing flexible sheets or films of thermoplastic material which obviates the objections heretofore attendant prior methods and apparatus.

Another object of this invention is to provide an improved method for continuously extruding clear unsupported thermoplastic films at high speed with the aid of simple and inexpensive apparatus.

Another object of the invention is to provide an improved method of and apparatus for efficiently producing unsupported thermoplastic films by extrusion with the aid of an air knife or other means for supplying air under pressure to the exposed surface of the film as it is advanced about a carrying member.

Still another object of the invention is to provide an improved method of and apparatus for effectively producing unsupported thermoplastic films having desired surface characteristics and/or clarity and transparency in a rapid manner.

A further object of the present invention is to provide an improved method of producing unsupported thermoplastic sheeting which comprises, extruding a curtain of unsupported thermoplastic material in substantially fluid condition to a carrying surface, moving the carrying surface to advance the extruded curtain away from the source of extrusion, and causing the advancing curtain to snugly engage the carrying surface by directing air under pressure against the curtain as it is advanced.

An additional object of the present invention is to provide an improved apparatus for producing unsupported thermoplastic sheeting in accordance with the improved method and in which air under pressure is utilized as a backing and for causing the extruded sheet to snugly engage the carrying member on which it is advanced.

These and other specific objects and advantages of the invention will become apparent from the following detailed description.

A clear conception of the several features constituting the present invention and of the steps of the improved method, as well as details of the apparatus for performing such steps, may be had by referring to the drawing accompanying and forming a part of this specification.

FIG. 1 is a diagrammatic view illustrating the improved method of continuously producing unsupported thermoplastic film and typical apparatus for exploiting such method; and FIG. 2 is a view taken along the line 2—2 of FIG. 1 looking into the air discharge nozzle or orifice of the air knife and showing a fragment of the thermoplastic sheet in phantom by means of dotted lines.

While the invention is shown and described herein as being especially advantageously applicable to the extrusion of a thermoplastic material such as polyethylene as a clear transparent and unsupported film, it should be understood that it is not intended or desired to restrict the scope or utility of the invention by reason of such limited embodiment; and it is also contemplated that certain terminology employed herein shall be given the broadest possible interpretation consistent with the disclosure.

As for the descriptive terms used herein, the phrase "unsupported" is intended to denote a sheet, film or curtain of material which is not backed, laminated or otherwise reinforced by or secured to another sheet of film.

The term "substantially fluid" as used to describe the condition of the hot thermoplastic material extending from the extrusion die to the cylinder is intended to indicate a condition in which the material is soft and capable of being drawn, expanded or stretched to a desired gauge or thickness prior to the state in which it becomes solidified or set. As for the phrase "glazed" in defining the arcuate surface of the draw or carrying roll, it is intended that this term denote an optically smooth, glossy, relatively impervious, highly polished, or glass-like finish whether in the nature of a separate coating or film or merely a treatment of the surface of the basic material from which the body of the cylinder is formed.

Referring to the drawing, the several steps of the improved method of producing unsupported thermoplastic sheeting are as follows. First, a sheet or curtain of unsupported thermoplastic material heated to substantially fluid or flowable condition is extruded or fed in a suitable manner, as at 5, toward and tangentially into contact with the arcuate peripheral surface of a carrying member. As the curtain 5 is thus fed to the arcuate carrying surface, the carrying surface is advanced at a somewhat higher rate of speed than the rate of extrusion of the curtain to thereby draw the extruded curtain away from the source of extrusion. As the unsupported and rather fluent curtain 5 initially contacts the arcuate carrying surface, air under pressure is directed transversely across and against the advancing curtain to thereby cause the same to snugly engage the carrying surface. Also, while the curtain or sheet 5 is advanced along the arcuate path, it is cooled to solidified condition as by cooling the carrying member or the surface thereof, and the curtain is advanced with the carrying member surface in intimate contact therewith beyond the point at which air under pressure is directed thereagainst to thus set the thermoplastic material. The sheet is then withdrawn from the arcuate carrying surface, suitably trimmed as necessary, and finally wound into a roll for subsequent use.

To impart a high degree of transparency and clarity to the sheet or film as it is thus formed, it is essential that the arcuate sheet contacting and carrying surface be buffed or polished and optically smooth and glazed with no apparent surface irregularities or blemishes. In this connection, it has been found preferable to form the arcuate carrying surface from a material such as stainless steel or other hard metal having a highly polished and mirror-like finish. Furthermore, the material from which the arcuate carrying surface if formed should be selected for its ability to release from the thermoplastic material under treatment or it should be so treated as to readily release therefrom so that the carrying surface does not have an affinity for the thermoplastic. It has been found that only a small amount of air pressure is necessary to back up the advancing curtain or web and cause it to snugly engage the carrying surface, and tests have shown that air under at least one pound pressure is sufficient in this regard if directed against the web at about the point of its initial contact with the carrying surface. It has furthermore been found that the curtain issuing from the extruder should make initial contact with the carrying surface between one to six inches from the source of extrusion, and the gauge or thickness of the film or web may be varied as desired by adjusting the speed of advancement of the arcuate carrying surface relative to the rate of feed or extrusion of the material thereto, thereby varying the amount of stretch or rate at which the curtain of thermoplastic material is drawn toward and onto the arcuate carrying surface. To insure release of the web from the arcuate carrying surface, it is desirable to cool the surface of the carrying member to 130° to 140° Fahrenheit and to carry the web on the cooled surface of the carrying member for an extended portion of its travel. However, it is not intended to limit the degree of cooling since this may be varied according to the materials being worked.

In the apparatus shown for performing the improved method, the carrying surface for the extruded curtain is formed by a suitably driven metallic cylinder or drum 7 adapted to be rotated in the direction of the arrow at higher peripheral speed than the rate of extrusion. The cylinder 7 may be formed of any suitably hard and temperature resistant material such as stainless steel or the like with the peripheral surface thereof being highly polished or chrome plated to an optically smooth and mirror-like glossy surface when it is desired to produce clear transparent thermoplastic sheeting. The curtain 5 of thermoplastic material in substantially fluid condition is fed tangentially to the arcuate peripheral surface of the cylinder 7 from the die or head 9 of a suitable extruder 10, the die 9 being provided with the customary discharge slit and the extruder being readily controllable to vary the rate of feed or extrusion. To cause the curtain 5 of extruded thermoplastic to snugly engage the polished periphery of the cylinder 7, air under pressure is directed against and transversely across the advancing curtain at about its point of contact with the periphery of the cylinder, and for this purpose, an air knife 12 or the like may be employed. The air knife 12 has a transversely elongated discharge orifice 13 connected to a pump or compressor 15 or other suitable source of air under pressure through a conduit 16, and it has been found that as little as one pound pressure is sufficient to cause the curtain to snugly engage the periphery of the cylinder 7. The metallic cylinder 7 is hollow and may be provided with a hollow shaft 18 providing an inlet at one end and an outlet at the other end of the cylinder for circulating a cooling liquid internally thereof to thereby uniformly cool the peripheral film carrying surface to the desired extent, thus also cooling the extruded curtain 5 as it contacts and advances along the periphery of the cylinder and forming the curtain into a self-supporting sheet or web 6. As previously indicated, suitable means are provided for rotating the cylinder 7 in the direction of the arrow, and means should also be provided for controlling the speed thereof relative to the rate of feed of the curtain 5 from the extrusion die 9 so that the curtain is drawn or pulled away from the extrusion die and is thereby drawn to the desired gauge or thickness while in substantially fluid condition. From the periphery of the cylinder 7, the sheet 6 is guided about a series of suitable guide rolls 20 past a suitable trimming device 22 which may be located in any desired convenient location beyond the cylinder 7, the trimmed material or so-called bead trim 24 being suitably removed by suction or the like in a customary manner. From the trimmer 22, the sheet 6 is guided about suitable guide rolls 26 and is finally wound in a roll 28 supported on the suitable spindle reel 29 from which it may be dispensed for subsequent use.

The curtain 5 of thermoplastic material is, as above indicated, fed through the slit in the extrusion die 9 at a given rate of speed and as a continuous sheet of a width dependent upon the length of the slit in the extrusion die, and since the thermoplastic material thus fed from the extrusion die tangentially to the periphery of the cylinder 7 is in heated and substantially fluid condition, the cylinder 7 when driven at a faster peripheral rate of speed than the rate of feed of the material from the die will pull the curtain 5 away from the die and thus draw the same to a uniform gauge or thickness dependent upon the relative speeds of the cylinder 7 to the rate of feed from the extrusion die 9. As the curtain 5 is fed from the extruder to the cylinder, the air knife 12 directs air under pressure transversely across the entire width of the curtain and toward the arcuate carrying surface of the cylinder to cause the curtain to intimately contact the peripheral surface of the carrying member or cylinder, and as the film thus contacts the cooled carrying surface of the cylinder 7 and is thereafter advanced in intimate contact with such surface for a considerable distance of travel, the film is set and readily releases from the cooling cylinder for further advancement about the guide rolls and then to the cutter or trimmer 22 and spindle 29. To prevent backflow of air issuing from the knife 12, a baffle 31 disposed at an angle with respect to the air knife and interposed between the extruder die 9 and air knife 12 is provided as shown.

The method and apparatus herein described as embodying the invention may be used to advantage in the production of films of inherently plastic materials such as polyethylene, Pliofilm, Saran, vinyl films, nylon films, polyesters, cellulose acetate, celluose acetate butyrate, ethyl cellulose, and polystyrene. With regard to the cylinder 7, any material capable of being fabricated into a suitable cooling cylinder and capable of being polished or otherwise treated to substantially optical smoothness and having sufficient heat resistance and no deleterious effect upon the particular thermoplastic material being processed may be satisfactorily utilized, and while highly polished chrome plated steel drums or cylinders have been indicated herein as being preferably used, they may nevertheless be fabricated nickel, brass, bronze or titanium.

If the method and apparatus are to be used in the production of a translucent matte finish thermoplastic film rather than a clear transparent film as described, the surface of the cylinder 7 may be roughened as by sand blasting or may be otherwise suitably provided with a desired pattern or patterns. The cylinder 7 may be internally cooled in any suitable known manner by circulating water, brine, glycol or the like therethrough to effect the highest possible degree of cooling in order to cause setting of the film 6 as it travels over the arcuate periphery of the cylinder.

The following is an example of the procedure for producing a clear, transparent, glossy finish polyethylene film of 1½ mils thickness at the rate of 200 feet per minute. The thermoplastic material selected is a polyethylene resin identified as Alathon 22A from E. I. du Pont de Nemours & Company having a melt index 3, a density of 0.921 and a molecular weight of 21,000. An Eagan extruder having a 20 to 1 barrel length to barrel diameter with the barrel divided into three heating zones with the adapter section having separately controlled heating means and with a die having a 23 inch long slit is used. The temperature settings range from 400° Fahrenheit in zone 1 of the barrel to 525° Fahrenheit in zone 3 of the barrel as well as in the adapter and approximately the same in the die so that the stock temperature as it extrudes from the die is approximately 525° Fahrenheit. The die gap is set at 30 mils and the screw speed set at 48 r.p.m. An internally cooled carrying cylinder 24 inches in diameter having a polished mirror-like finish chrome plated surface is used in conjunction with an air knife having a discharge orifice of at least 23 inches in length so as to extend transversely across the extruded film, the air knife being connected with a suitable source of air under pressure so as to be capable of applying at least one pound of pressure at the inlet side of the air knife to the film and toward the periphery of the cylinder.

With the extruder screw feed set at 48 r.p.m. and with the distance from the die to the point of contact of the periphery of the cylinder set at 3½ inches, the cooling cylinder is rotated at a peripheral surface speed of 200 feet per minute with the cooling roll chilled to approximately 135° Fahrenheit. Also, the air knife is adjusted so as to exert a pressure of approximately 5 pounds at the inlet side of the air knife, and the film produced may, of course, be marginally trimmed to any desired extent dependent upon the desired width of the final film. It is found that the thermoplastic stock under treatment has excellent release properties from the cooling roll and if the cooling cylinder is not scratched or otherwise marred, extremely good quality, clear, glossy and transparent films are produced.

If it is desired to produce a clear transparent film having a translucent pattern design, the pattern desired may be sand blasted, embossed or otherwise scratched or impressed in the peripheral surface of the cooled carrying cylinder, and the same extruder and other equipment and settings of the device as hereinabove set forth may be followed. It is also apparent that the present process and apparatus are not limited to the production of polyethylene films but can also be used in the production of other thermoplastic films, and the materials selected for forming the arcuate surfaces as well as the regulation of temperature settings and control of speeds are dependent upon the material being treated and the desired final thickness of the film.

As for the air pressure required by the air knife, it is only necessary to apply sufficient backing pressure to the film to exclude entry of air between the periphery of the cylinder and the film to thereby prevent distortion and streaking of the film due to non-uniform cooling which otherwise occurs.

In attempting to determine the surface characteristics required by the cylinder 7 in order to obtain satisfactory clarity in the production of transparent sheet material, tests were made from a set of standard surface blocks made by General Electric Company for standard roughness specifications as described in General Electric Company Catalog No. 8651831G2. These blocks are made in varying degrees of smoothness, defined in terms of the maximum height of the peaks and valleys present on the surface, and the blocks are numbered according to the number of microinches of this surface variation. Replicas of these test block surfaces were made in cellulose acetate film softened with acetane vapors, the softened film being pressed into the surface of the blocks and then removed and dried to obtain a transparent film replica of the surfaces of the blocks. Examination of these replicas held against the light permitted a determination of the degree of diffusion obtained with the various degrees of surface roughness, and replicas of blocks from 4 to 250 microinches of surface smoothness were made. Upon examination of these films, it appears that polyethylene should possess a clarity at least equal to No. 8 as based on these tests in order to be considered satisfactory where transparent film is desired, and in such instances, the rollers 8, 9 should have a peripheral surface smoothness not rougher than 8 microinches.

It is not desired or intended to limit this invention to the exact details of the apparatus or to the precise steps of the method herein shown and described, since various modifications within the scope of the appended claims may occur to persons skilled in the art to which this invention pertains.

I claim:

1. The method of producing unsupported thermoplastic sheeting, which comprises, extruding a curtain of unsupported thermoplastic material in substantially fluid condition and of substantially uniform cross section to an arcuate carrying surface, revolving the carrying surface to advance the extruded curtain away from the source of extrusion, and causing the advancing curtain to snugly engage the arcuate carrying surface by directing an elongated stream of air under pressure against the curtain entirely transversely across the same as it is advanced.

2. The method of producing unsupported thermoplastic sheeting, which comprises, extruding a curtain of unsupported thermoplastic material in substantially fluid condition tangentially to an arcuate carrying surface, revolving the carrying surface to advance the extruded curtain away from the source of extrusion, causing the advancing curtain to snugly engage the arcuate carrying surface by directing a narrow band of air under pressure against the curtain transversely entirely across the same as it is advanced, and simultaneously cooling the arcuate surface to thereby cool the curtain to solidified condition and provide an unsupported sheet while it is advanced along the arcuate path.

3. The method of producing unsupported thermoplastic sheeting, which comprises, extruding a curtain of unsupported thermoplastic material in substantially fluid condition and of substantially uniform cross section to a carrying surface, moving the carrying surface along an arcuate path to advance the extruded curtain away from the source of extrusion, and causing the advancing curtain to snugly engage the carrying surface by directing a narrow band of air under at least one pound pressure entirely across and against the curtain at about the point of its intial contact with the carrying surface.

4. The method of producing unsupported thermoplastic sheeting, which comprises, extruding a curtain of unsupported thermoplastic material in substantially fluid condition tangentially to an arcuate carrying surface, revolving the carrying surface to advance the extruded curtain away from the source of extrusion, and causing the advancing curtain to snugly engage the arcuate carrying surface by directing a narrow elongated stream of air under at least one pound pressure transversely entirely across and against the curtain at about the point of its initial contact with the carrying surface only and within three to six inches from the point of extrusion.

5. Apparatus for producing thermoplastic sheeting comprising, means forming a cylindrical carrying surface, means for extruding a curtain of thermoplastic material in substantially fluid condition tangentially to said carrying surface, means for revolving said carrying surface to advance said curtain away from said extrusion means, and means including an elongated nozzle for directing a narrow stream of air under pressure transversely entirely across and against said curtain to cause the same to snugly engage said carrying surface as it is advanced therewith.

6. Apparatus for producing thermoplastic sheeting comprising, means forming a carrying surface, means for extruding a curtain of thermoplastic material in substantially fluid condition to said carrying surface, means for moving said carrying surface along an arcuate path to advance said curtain away from said extrusion means, an air knife having an elongated orifice extending across and directed toward said carrying surface for directing air under pressure transversely entirely across and against the exposed side of said curtain at about the point of its initial contact with said carrying surface to cause the same to snugly engage said carrying surface as it is advanced therewith, and a baffle interposed between said extrusion means and said air knife.

7. Apparatus for producing thermoplastic sheeting comprising, a rotatable hollow metal cylinder, means for interiorly cooling said cylinder, means for extruding a curtain of thermoplastic material in substantially fluid condition and of substantially uniform cross section throughout its width tangentially to the periphery of said cylinder, means for revolving said cylinder to advance said curtain away from said extrusion means, a transversely elongated nozzle forming an air knife directed toward said cylinder and extending transversely entirely across said curtain locally at about the point of its initial contact with said cylinder, means for supplying air under pressure to said air knife and against said curtain to cause the curtain to snugly engage the periphery of said cylinder as it revolves, a baffle interposed between said extrusion means and said air knife and extending toward said curtain, and means for advancing said curtain away from said cylinder.

References Cited in the file of this patent

UNITED STATES PATENTS

| | | |
|---|---|---|
| 2,212,770 | Foster | Aug. 27, 1940 |
| 2,308,024 | Piker | Jan. 12, 1943 |
| 2,364,435 | Foster et al. | Dec. 5, 1944 |
| 2,736,066 | Chren et al. | Feb. 28, 1956 |